United States Patent
Priest

[11] 3,712,030
[45] Jan. 23, 1973

[54] EXHAUST DEPURATOR
[76] Inventor: John D. Priest, 608 Briarcrest Crest, Midwest City, Okla. 73110
[22] Filed: Sept. 14, 1970
[21] Appl. No.: 72,058

[52] U.S. Cl. ...................55/213, 23/284, 55/276, 55/308, 55/313, 55/387, 55/482, 55/517, 55/DIG. 30, 60/311, 181/44
[51] Int. Cl. ..............................................B01d 39/02
[58] Field of Search ................55/515-519, DIG. 30, 55/441, 312-314, 307-309, 212, 215, 420, 276, 418, 213, 387; 23/2 E, 288 F, 284; 60/311; 210/DIG. 17, 130, 131; 181/44

[56] References Cited

UNITED STATES PATENTS

| | | | |
|---|---|---|---|
| 3,129,078 | 4/1964 | Hobbs | 55/DIG. 30 |
| 2,145,535 | 1/1939 | Vokes | 210/131 |
| 2,288,943 | 7/1942 | Eastman | 23/288 F |
| 1,871,908 | 8/1932 | Orem | 55/308 |
| 3,225,526 | 12/1965 | Bayles et al. | 55/420 |
| 2,840,183 | 6/1958 | George | 55/518 X |
| 3,268,077 | 8/1966 | Ball | 210/131 |

FOREIGN PATENTS OR APPLICATIONS

| | | | |
|---|---|---|---|
| 202,861 | 8/1923 | Great Britain | 55/519 |
| 504,354 | 4/1943 | Canada | 210/131 |
| 936,733 | 7/1948 | France | 55/515 |
| 109,892 | 3/1940 | Australia | 210/131 |

*Primary Examiner*—Frank W. Lutter
*Assistant Examiner*—Vincent Gifford
*Attorney*—Robert K. Rhea

[57] ABSTRACT

An exhaust depurator comprising a muffler-like shell interposed in a combustion engine exhaust pipe. The shell contains coaxial foraminated double walled tubular members having the space between the double walls filled with an exhaust gas filtering material for purifying the major portion of the exhaust gases from an internal combustion engine. Bypass means prevent exhaust gas back pressure against the engine exhaust valves.

2 Claims, 4 Drawing Figures

PATENTED JAN 23 1973   3,712,030

JOHN D. PRIEST
INVENTOR.

BY
Robert K. Rhea
AGENT

EXHAUST DEPURATOR

BACKGROUND OF THE INVENTION

1. Field of the Invention

The present invention relates to a muffler-like device for purifying the exhaust gases of an internal combustion engine.

Mufflers presently used on the exhaust pipe of internal combustion engines, for the most part, operate efficiently for their intended purpose of reducing the noise of gas explosions from the respective cylinders. Burning of fuel, such as gasoline, diesel fuel, and the like, in an internal combustion engine is usually incomplete resulting in various unburned hydrocarbons, carbon monoxide and other impurities entrained in the exhaust stream which are exhausted to and tend to polute the atmosphere.

This invention contemplates interposing a muffler-like device in the engine exhaust stream in place of the muffler or as an auxiliary muffler-like device which will remove most of the impurities from the engine exhaust.

2. Description of the Prior Art

Exhaust purifying devices, as shown by prior patents, have not been generally acceptable presumably for the reasons that some of them developed significant back pressures, usually have a relatively short life and therefore represented an additional cost and that they were not heretofore believed necessary. Examples of exhaust gas purifiers are shown by U.S. Pat. Nos. 2,991,160 and 3,429,656.

This exhaust gas depurator is distinctive over these patents principally by its substantially conventional-like construction which includes spaced-apart double walls for a coaxial tube and sleeve within its outer shell wherein the spacing between the double walls is filled with a readily available filtering material thus rendering this device relatively inexpensive in operation.

SUMMARY OF THE INVENTION

A cylindrical shell or jacket is provided with coaxial diametrically reduced end connection portions forming inlet and exhaust openings to be interposed in a combustion engine exhaust line. A coaxial tube, within the jacket, has its forward end slidably received by the inlet end of the jacket for longitudinal sliding movement.

The major portion of the tube is provided with a foraminated double wall which is coaxially surrounded by a sleeve fixed within the jacket and similarly having a foraminated double wall. The sleeve has a circular cross-section area greater than the tube and less than the jacket and its overall length less than the jacket forming an exhaust gas bypass or passageway at the forward limit of the sleeve to relieve exhaust back pressure. The forward end portion of the tube is provided with ports which mate with the bypass when the tube is forced rearwardly by excessive exhaust gas pressure. The rearward end of the tube is slidably supported by a shaft coaxially connected with the inner surface of the rearward wall of the sleeve. A resilient member is interposed between the rearward end of the sleeve and tube for normally biasing the tube toward the inlet of the jacket in mismating relation with respect to the bypass. The spacing between the double walls of the tube and sleeve are filled with a granulated filtering material and the double walls of the tube and sleeve are further provided with a plurality of orifices bypassing a portion of the engine exhaust in a noise muffling action to prevent exhaust gas back pressure.

The principal object of this invention is to provide a muffler-like device to be interposed in a combustion engine exhaust stream for materially decreasing the quantity of unburned hydrocarbons and other impurities suspended in an exhaust gas stream.

DESCRIPTION OF THE PREFERRED EMBODIMENTS

Figure 1:
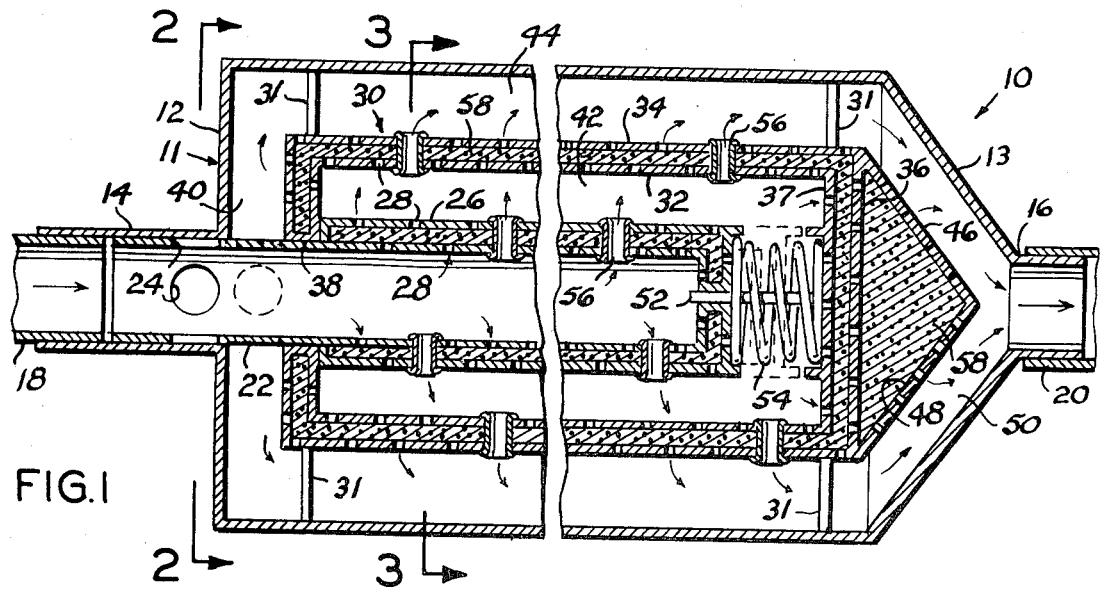
FIG. 1 is a longitudinal cross-sectional view of the device.
Figure 2:
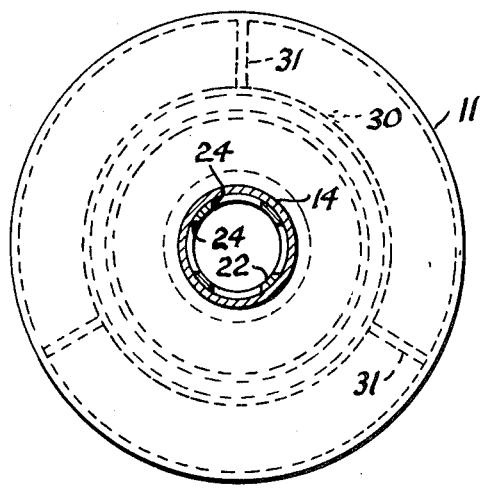
FIG. 2 is a vertical cross-sectional view, partially in elevation, taken substantially along the line 2—2 of FIG. 1.
Figure 3:
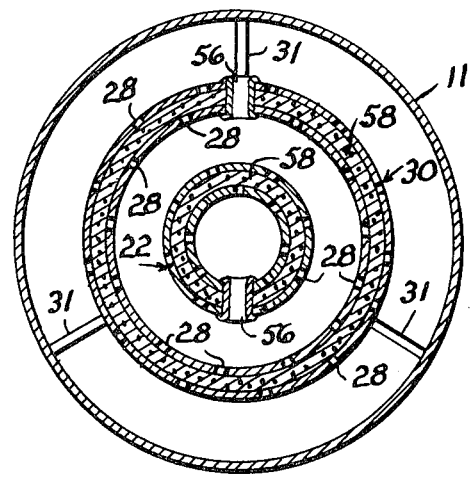
FIG. 3 is a vertical cross-sectional view, taken substantially along the line 3—3 of FIG. 1; and, FIG. 4 is a fragmentary cross-sectional view, illustrating an alternative manner of forming exhaust gas orifices.
Figure 4:
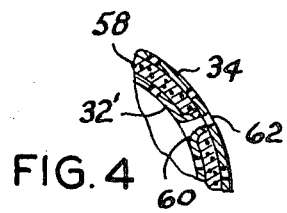

Like characters of reference designate like parts in those figures of the drawings in which they occur.

In the drawings:

The reference numeral 10 indicates the device, as a whole, which is cylindrical in general configuration. The device 10 includes an outer shell or jacket 11 having a forward end wall 12 and a converging rearward end wall 13 and diametrically reduced coaxial end portions 14 and 16 forming inlet and outlet openings which are interposed between and respectively connected with fragmentary end portions of an exhaust pipe, indicated at 18 and 20. An elongated tube 22 is coaxially received at its forward end portion by the inner wall of the jacket inlet 14 and terminates at its opposite closed end in spaced relation with respect to the exhaust end of the jacket. The forward end of the tube 22 is provided with a plurality of bypass openings 24 normally disposed within the jacket inlet end 14. The major portion of the tube 22 is provided with an outer wall 26 surrounding the rearward end and circumference of the tube 22 in spaced-apart relation and terminating in spaced relation with respect to the forward end wall 12 of the jacket 11, thus forming a double wall for the tube. The double walls of the tube are each provided with a plurality of relatively small apertures or openings 28 in off-set or staggered relation.

A sleeve 30, connected with the jacket wall by braces 31, surrounds the double walled portion of the tube 22 and is defined by an inner wall 32 and an outer wall 34 positioned in spaced-apart relation to form an annular space therebetween. The sleeve is characterized by diametric spaced-apart rearward end walls 36 and 37 spaced rearwardly of the rearward end of the double walled portion of the tube 22. The forward end of the sleeve similarly has double walls and opening 38 therein surrounding the tube 22 forwardly of the forward limit of its double walled portion and spaced rearwardly of the forward end wall 12 of the jacket to define an exhaust bypass or passageway 40. The circular cross-section area of the sleeve 30 is greater than the diameter of the double walled portion of the sleeve 22 and less than the diameter of the jacket 11 thus forming an annular chamber 42 between the sleeve 30 and double walled portion of the tube 22 and an annular chamber 44 within the jacket and around the sleeve. The rearward end wall 36 of the sleeve is connected with a perforated rearwardly converging wall 46 forming a chamber 48 rearwardly of the sleeve 30 and defining an exhaust gas passageway 50 between the wall 46 and the rearward end wall 13 of the jacket. The passageways 44 and 50 thus form an exhaust passageway for the purposes presently explained.

A shaft 52 is coaxially connected with the inner surface of the innermost sleeve end wall 37 and is slidably disposed at its other end portion within a suitable opening in the rearward end of the tube 22. A spring 54 is interposed between the rearwardmost end wall of the tube 22 and sleeve end wall 37 for normally biasing the tube 22 in a forward direction and maintaining its exhaust bypass openings 24 within the jacket inlet 14 in mismating relation with respect to the exhaust bypass 40.

The double walled portion of the tube 22 and circumferential portion of the sleeve 30 are each provided with a selected number of relatively short tubular members 56 extending therethrough and sealed with the respective inner and outer walls forming orifices, in staggered relation with respect to each other, which bypass a portion of the exhaust gases to the respective passageways 42 and 44 and prevents exhaust gas back pressure or build-up. The spacing between the respective tube double walls and sleeve double walls is filled with a granular filtering material such as lithium hydroxide or charcoal 58. Similarly, the chamber 48 is filled with the filtering agent.

Alternatively the orifices between the respective double walls of the tube or sleeve may be formed by upsetting the inner wall 32', as at 60, so that its opening mates with an opening 62 formed in the other or outer wall 34.

OPERATION

In operation exhaust gases enter the inlet end 14 of the jacket and a greater portion thereof passes through the openings 28 and filtering material 58 before reaching the exhaust chambers 40, 44 and 50. A portion of the exhaust gases pass through the orifices formed by the tubes 56. In the event the volume of exhaust gases is increased beyond the capability of the orifices and filter openings 28 a back pressure or build-up of the exhaust gases contained by the tube 22 forces the tube 22 in a rearward sliding action, compressing the spring 54 which mates the bypass openings 24 with the forward exhaust bypass 40. When the exhaust gas back pressure is relieved below a predetermined setting the spring returns the tube 22 to its normal forwardly disposed position wherein the bypass openings 24 are again mismated by the bypass 40.

Obviously the invention is susceptible to changes or alterations without defeating its practicability, therefore, I do not wish to be confined to the preferred embodiment shown in the drawings and described herein.

I claim:

1. An exhaust depurating muffler, comprising:

a cylindrical jacket having an inlet end and an outlet end;

coaxial tube and sleeve means coaxially disposed within said jacket,
said tube and sleeve means including double walled portions forming filter material receiving spaces,
said double walled portions each having openings in one wall off-set with respect to other openings in its other wall;

granulated exhaust filtering material filling the spaces between the walls of the respective said double walled portions, said tube including an apertured single wall open end portion slidably received within the inlet end of said jacket, the other end of said tube being closed and terminating in spaced relation with respect to the outlet end of said jacket, said sleeve means surrounding a major portion of said tube and having an end portion disposed in parallel spaced relation with respect to the closed end of said tube; and, a spring interposed between the closed end of said tube and
said sleeve end portion, said spring being responsive to exhaust gas pressure in said tube and permitting longitudinal movement of said tube single wall end portion into and out of said jacket inlet end for respectively covering and exposing the apertures.

2. The muffler according to claim 1 and further including:

a plurality of orifice forming tubes extending through the respective double walls of said tube and sleeve means.

* * * * *